(12) United States Patent
Auberon et al.

(10) Patent No.: US 9,129,074 B2
(45) Date of Patent: Sep. 8, 2015

(54) METHOD FOR MAKING MECHANICAL LINKS

(75) Inventors: Marcel Auberon, St Medard en Jalles (FR); Nicolas Petermann, Bordeaux (FR)

(73) Assignee: ASTRIUM, SAS, Paris (FR)

( * ) Notice: Subject to any disclaimer, the term of this patent is extended or adjusted under 35 U.S.C. 154(b) by 828 days.

(21) Appl. No.: 13/384,183

(22) PCT Filed: Jul. 6, 2010

(86) PCT No.: PCT/EP2010/059672
§ 371 (c)(1),
(2), (4) Date: Feb. 16, 2012

(87) PCT Pub. No.: WO2011/006805
PCT Pub. Date: Jan. 20, 2011

(65) Prior Publication Data
US 2012/0136473 A1    May 31, 2012

(30) Foreign Application Priority Data
Jul. 16, 2009   (FR) ...................................... 09 54936

(51) Int. Cl.
*G06F 17/50* (2006.01)

(52) U.S. Cl.
CPC ............ *G06F 17/50* (2013.01); *G06F 2217/16* (2013.01)

(58) Field of Classification Search
CPC ................ H02J 3/006; H02J 2003/001; H02J 2003/007; Y02E 60/76; Y04S 40/22; G06F 17/50; G06F 2217/16
USPC .......... 29/700, 705, 711, 715, 717–718, 721; 700/145, 95–96; 416/1–2, 62, 416/223 R–226
See application file for complete search history.

(56) References Cited

U.S. PATENT DOCUMENTS

| | | | | |
|---|---|---|---|---|
| 3,608,640 A | * | 9/1971 | Willhite et al. | 166/380 |
| 4,278,277 A | * | 7/1981 | Krijgsman | 285/93 |
| 5,288,109 A | * | 2/1994 | Auberon et al. | 285/222.4 |
| 6,227,252 B1 | * | 5/2001 | Logan | 138/172 |
| 6,654,449 B1 | * | 11/2003 | Greene et al. | 349/67 |
| 7,195,418 B2 | * | 3/2007 | Durand et al. | 403/408.1 |
| 7,481,624 B2 | * | 1/2009 | Wobben | 416/132 B |
| 8,171,633 B2 | * | 5/2012 | Zirin et al. | 29/889.61 |
| 2012/0141284 A1 | * | 6/2012 | Auberon et al. | 416/226 |

FOREIGN PATENT DOCUMENTS

| | | |
|---|---|---|
| EP | 1584817 A1 | 10/2005 |
| EP | 1878915 A2 | 1/2008 |
| FR | 2675563 A1 | 10/1992 |
| WO | 0148378 A1 | 7/2001 |

* cited by examiner

Primary Examiner — Ramesh Patel
(74) Attorney, Agent, or Firm — Perman & Green, LLP

(57) ABSTRACT

A method of making a mechanical multishear link includes sizing the multishear link by breaking down a system comprised by the link into as many subassemblies as there are simple shear interfaces, defining the subassemblies around each shear interface, describing each shear by its stiffness, and applying the mechanical relationships to achieve a system of equations for a computer-assisted resolution by applying the Huth method to each shear interface.

13 Claims, 4 Drawing Sheets

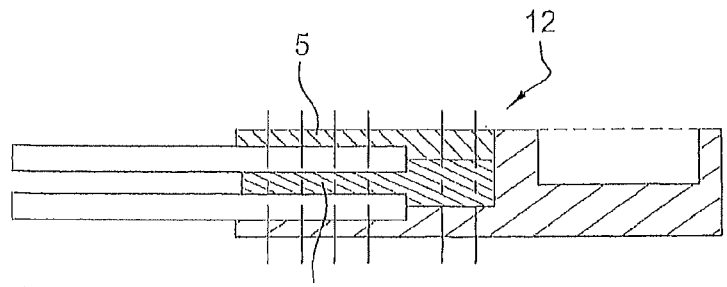
Fig. 4
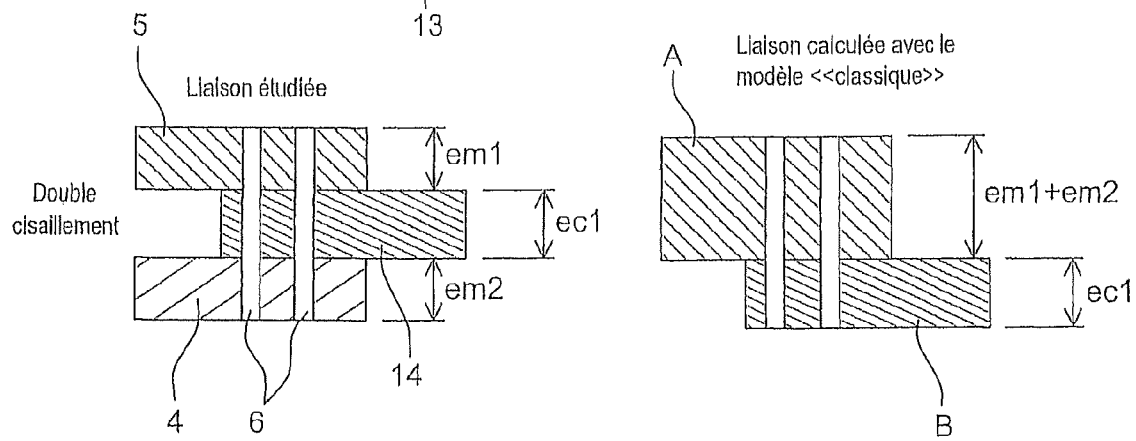
Fig. 5
Fig. 6
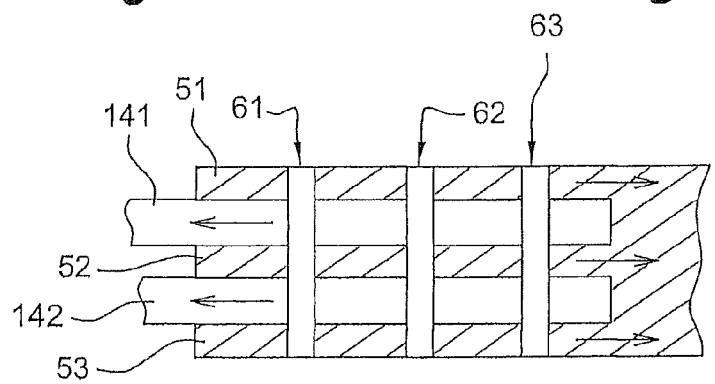
Fig. 7
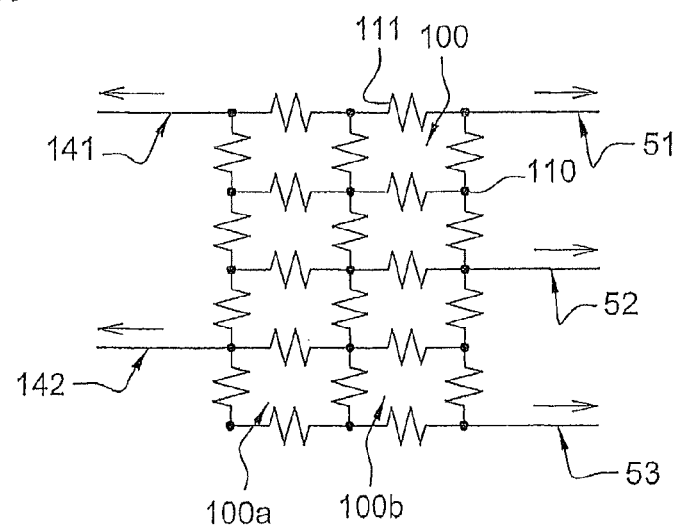
Fig. 8

$$
\begin{bmatrix}
\frac{1}{r_{11}}+\frac{1}{R_{11}}+\frac{1}{R_{12}} & -\frac{1}{R_{12}} & 0 & 0 & 0 & 0 & 0 & 0 & 0 & 0 & 0 & 0 & 1 & 0 & 1 & 0 \\
-\frac{1}{R_{12}} & \frac{1}{r_{12}}+\frac{1}{R_{12}}+\frac{1}{R_{13}} & -\frac{1}{R_{13}} & 0 & 0 & 0 & -\frac{1}{r_{21}} & 0 & 0 & 0 & 0 & 0 & 0 & 0 & 0 & 0 \\
0 & -\frac{1}{R_{13}} & \frac{1}{r_{13}}+\frac{1}{R_{13}}+\frac{1}{R_{14}} & -\frac{1}{R_{14}} & 0 & 0 & 0 & -\frac{1}{r_{22}} & 0 & 0 & 0 & 0 & 0 & 0 & 0 & 0 \\
0 & 0 & -\frac{1}{R_{14}} & \frac{1}{r_{14}}+\frac{1}{R_{14}}+\frac{1}{R_{15}} & 0 & 0 & 0 & 0 & -\frac{1}{r_{23}} & 0 & 0 & 0 & 0 & 0 & 0 & 0 \\
0 & 0 & 0 & 0 & \frac{1}{r_{21}}+\frac{1}{R_{21}}+\frac{1}{R_{22}} & -\frac{1}{R_{22}} & 0 & 0 & 0 & -\frac{1}{r_{24}} & 0 & 0 & 0 & 1 & 0 & 1 \\
0 & 0 & 0 & 0 & -\frac{1}{R_{22}} & \frac{1}{r_{22}}+\frac{1}{R_{22}}+\frac{1}{R_{23}} & -\frac{1}{R_{23}} & 0 & 0 & 0 & 0 & 0 & 1 & 0 & 0 & 1 \\
0 & -\frac{1}{r_{21}} & 0 & 0 & 0 & -\frac{1}{R_{23}} & \frac{1}{r_{23}}+\frac{1}{R_{23}}+\frac{1}{R_{24}} & -\frac{1}{R_{24}} & 0 & 0 & 0 & 0 & 0 & 0 & 0 & 0 \\
0 & 0 & -\frac{1}{r_{22}} & 0 & 0 & 0 & -\frac{1}{R_{24}} & \frac{1}{r_{24}}+\frac{1}{R_{24}}+\frac{1}{R_{25}} & 0 & 0 & 0 & 0 & 0 & 0 & 0 & 0 \\
0 & 0 & 0 & -\frac{1}{r_{23}} & 0 & 0 & 0 & 0 & -\frac{1}{r_{31}} & 0 & 0 & 0 & 1 & 0 & 1 & 0 \\
0 & 0 & 0 & 0 & -\frac{1}{r_{24}} & 0 & 0 & 0 & 0 & -\frac{1}{r_{32}} & 0 & 0 & 0 & 1 & 0 & 1 \\
0 & 0 & 0 & 0 & 0 & 0 & 0 & 0 & 0 & 0 & -\frac{1}{r_{33}} & 0 & 1 & 0 & 0 & 1 \\
0 & 0 & 0 & 0 & 0 & 0 & 0 & 0 & 0 & 0 & 0 & -\frac{1}{r_{34}} & 0 & 1 & 0 & 0 \\
\end{bmatrix}
$$

$$
\times \begin{bmatrix} f_{11} & f_{12} & f_{13} & f_{14} & f_{21} & f_{22} & f_{23} & f_{24} & f_{31} & f_{32} & f_{33} & f_{34} \end{bmatrix}
$$

$$
= \begin{bmatrix} \frac{Fe_1}{R_{12}} & -\frac{Fe_1}{R_{12}} & \frac{Fe_2}{R_{14}} & -\frac{Fe_2}{R_{14}} & \frac{Fe_2}{R_{22}} & -\frac{Fe_2}{R_{22}} & \frac{Fe_2}{R_{24}} & -\frac{Fe_2}{R_{24}} & Fe_1 & Fe_2 & Fs_1 & Fs_2 \end{bmatrix}
$$

Fig. 11

METHOD FOR MAKING MECHANICAL LINKS

CROSS-REFERENCE TO RELATED APPLICATIONS

This application is the National Stage of International Application No. PCT/EP2010/059672 International Filing date, 6 Jul. 2010, which designated the United States of America, and which International Application was published under PCT Article 21 (s) as WO Publication No. WO2011/006805 A2 and which claims priority from, and benefit of, French Application No. 0954936 filed on 16 Jul. 2009, the disclosures of which are incorporated herein by reference in their entireties.

The disclosed embodiments relate to the technology of mechanical links for structural parts and particularly structural parts made from composite materials.

The disclosed embodiments specifically provide a method for making mechanical links particularly suitable for creating a device for assembling sections of wind turbine blades.

The disclosed embodiments particularly relate to the field of assembling large structural composite parts, such as large wind turbine blades.

BACKGROUND

Mechanical links, unlike adhesive bonds or welded connections, are links that can be disassembled.

One method that is often used to create mechanical links between composite structures or panels is to use multiple interfacing metal parts, each attached to the composite at discrete locations, and to use mechanical attachment means, such as screws, pins, bolts, or other means.

Although these solutions may appear to be optimized, that is not so, because they do not withstand stress uniformly over the entire wall of the composite structure.

This generates local over stress that resulting in a risk of progressive failure originating in the most stressed areas, a phenomenon called peeling.

In addition, these local over stresses are difficult to quantify through mechanical analysis, which degrades the reliability and optimization of the structure, thereby making the link difficult to guarantee.

It is conceivable to have multiple large structural composite parts, such as wind turbine blades, which can measure up to several dozen meters.

Wind turbine blades are made from composite materials that reduce movement in these parts, which decreases the attachment stress to be withstood.

These blades are usually made from multiple sections for easier transport and especially for transport by truck.

This therefore poses the problem of mechanically assembling the composite material parts in a solution that is mechanically optimized in terms of mass, particularly if the stress passed through the link is very high and complex, the link having to withstand mechanical stress, fatigue stress, and major environmental stress with a very high level of reliability.

Documents EP 1 584 817, EP 1 878 915, and WO 01/48378 disclose links between sections of wind turbine blades provided by multiple metal parts.

In document EP 1 878 915, the link uses metal rods inserts into the walls of the central casing and glued into place.

In document WO 01/48378, the links are distributed along the skin of the blade, and in document EP 1 584 817, separate ties, securely attached to the central casing, are attached together and consolidated by items that cover the gap between blades.

These embodiments use discrete mechanical attachment means.

Moreover, there are known methods for calculating metal/composite links using pins, although such calculations are quite complex because all phenomena to be taken into account, including the transfer of stress between the composite and the pins, shear in the pins, matting of the composite, the tensile strength of the composite and/or the metal, and scribing.

It should be noted that the known methods for calculating the transfer of stress are highly approximate, since they simplify the geometry of the assembly by representing them as a simple shear, making it possible to use the method for calculating shear, known as the Huth method.

Because of this approximation, traditional methods do not actually perform a thorough parametering of the links.

Specifically, the Huth method does not examine asymmetrical geometric links, which limits its scope of use.

Moreover, the calculations associated with this model, particularly for calculating the shear in the pins, cannot be extended for multishear, case in which such model is not at all adapted.

Document FR 2 675 563 discloses a method of linking a composite tube and a metal tube.

In this method, the metal part is attached to the composite both by an adhesive bond and by mechanical attachments, allowing possible mechanical flux to be higher. However, this method, for which optimizing the pin link depends on the orientation of the winding wires, is specific to coiled tubes and therefore specific to a particular method of manufacturing the composite material.

This concept does not apply directly to composite parts, such as sections of wind turbine blades, which are not usually manufactured by coiling and whose fibers are oriented as determined by the constraints of using those blades.

SUMMARY

The disclosed embodiments aim to define a mechanical link for structural parts and specifically a composite metal link that is reliable and optimized mechanically and in terms of mass, especially for use on sections of wind turbine blades.

The obtained link must specifically be able to be disassembled, minimize local over flux that the composite could likely encounter, be mechanically optimized, and be compatible with the aerodynamic requirements of a wind turbine blade.

To this end, the disclosed embodiments provide a method of creating a multishear mechanical link, characterized in that the multishear link is sized by breaking down the system comprised by the link into as many subassemblies as there are simple shear interfaces, defining the subassemblies around each shear interface, describing each shear by its stiffness, and applying the mechanical relationships to achieve a system of equations for a computer-assisted resolution by applying the Huth method to each shear interface.

Preferably, each area of the link is sized around the shears through an iterative process by adding material when an iteration indicates too much stress and by removing material when an iteration indicates low stress.

Advantageously, subassemblies are represented by sets of springs, with each spring representing the stiffness of the given material.

More specifically, the link is broken down into a set of mesh type Huth subsystems, and adjacent links are connected by a spring that translates the fact that the same material is used by two separate shear areas.

More specifically, the various stiffness measures are then calculated based on the properties of the given materials, the geometry of the parts being used, and the stress to be placed on the link.

Advantageously, each pin and each material is accounted for independently.

For a shear link of the fourth order with two composite blades, three metal blades, and three rows of pins, the method is to break down the link into a set of eight mesh type Huth subsystems.

Advantageously, subassemblies are represented by sets of four springs, with each spring representing the stiffness of the given material.

BRIEF DESCRIPTION OF THE DRAWINGS

Other characteristics and advantages of the disclosed embodiments will be apparent upon reading the following description of an example embodiment of the disclosed embodiments with reference to the drawings that show:

In FIG. 4: A sectional side view of a variant with an inserted splitter;

In FIG. 5: The link from FIG. 2, calculated according to the method of the disclosed embodiments;

In FIG. 6: The link from FIG. 2, calculated with the model of the prior art;

In FIG. 7: A schematic representation of a shear link of the fourth order with three rows of pins;

In FIG. 8: A breakdown of the link from FIG. 7 into "mesh" Huth subsystems;

In FIG. 11: The linear system according to the method of the disclosed embodiments for the link in FIG. 7.

DETAILED DESCRIPTION

Figure 1:
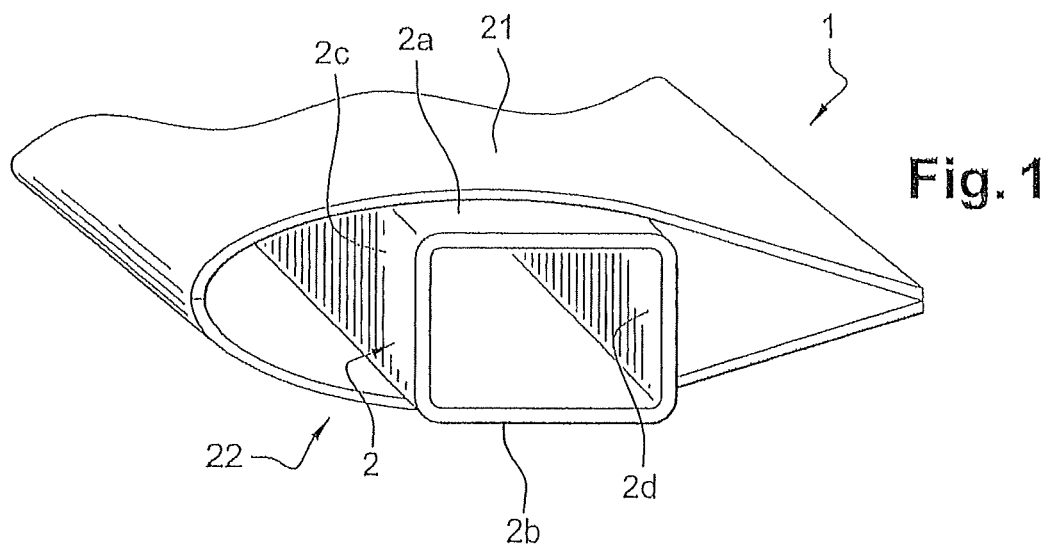
In FIG. 1: A schematic perspective view of a segment of a section of a wind turbine blade.

The method of sizing a mechanical link of the disclosed embodiments is intended for composite/metal links used in assembling sections 1 of wind turbine blades, an example of which is shown in FIG. 1.

This section comprises a skin forming the upper surface 21 and the lower surface 22 of the blade, and it comprises a central casing 2 that provides the mechanical strength of the blade.

Figure 3:
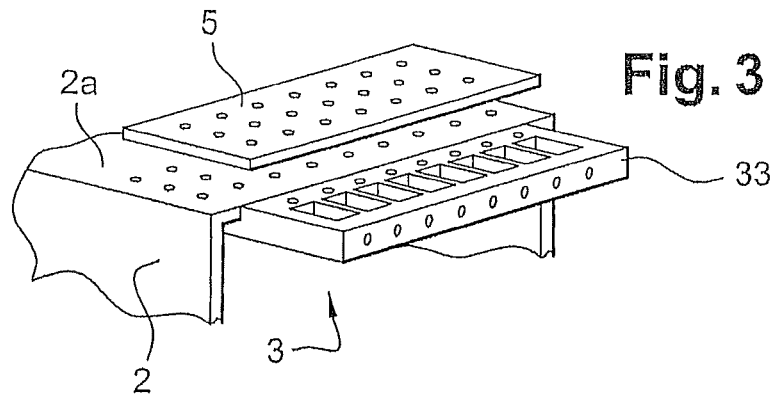
In FIG. 3: A schematic perspective view of the device in FIG. 2.

The device for assembling such sections includes at least one tie, for which a first embodiment in the form of a flat tie 3 is shown exploded in FIG. 3.

Figure 2:
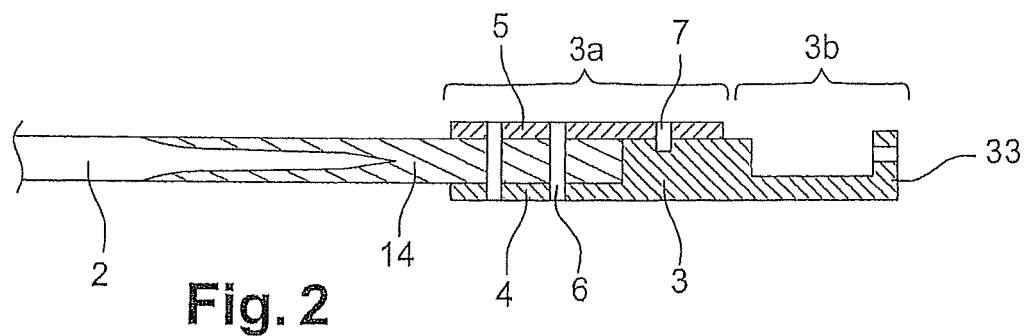
In FIG. 2: A schematic sectional view of a device achieved according to the method of the disclosed embodiments attached to an element of a section of a wind turbine blade.

The tie 3 is detailed as a section in FIG. 2, and this fastener comprises a first part 3a for assembling with the casing 2 and a second part 3b for mounting with a complementary tie supported by a casing of a second section.

The first part 3a comprises at least one composite/metal link.

According to FIG. 2, this link is a double shear link with a continuous fitting element 4 on at least one surface 2a of the casing 2, a back-fitting element 5, between which is received one end of said surface of the casing, attachment pins 6 passing through the fitting, the end of the surface and the back fitting, and means 7 for attaching the back-fitting to the fitting.

As part of the method of the disclosed embodiments, the composite metal links consist of a fitting and a back-fitting or splitter to provide an assembly having a double mechanical shear perpendicular to the link attachments, a more effective solution than a single shear link with a fitting on only one side.

The composite metal link is optimized using calculation elements, as described later.

This optimization allows to define the distribution and shape of the metal connections, the fitting, and the splitter, the geometry and the nature, diameter, and material of the attachments on each row, the optimal pitch per row and pitch between rows of the link.

In the example in FIG. 4, the composite/metal link is a multishear link 12 perpendicular to the attachments, and, in addition to the back-fitting 5, it integrates into the composite at least a metal-splitter 13 suitable for transmitting stress between the composite part and the metal fitting.

A solution for assembling with multishear perpendicular to attachments by integrating into the composite metal splitters allows the number of splitters to be adjusted according to the distribution of the shear under the attachments.

Effectively, the more splitters there are, the greater the stress per attachment for transmitting stress between the composite portion and the metal fitting.

This reduces the diameter of the bolts and allows a better contribution from the composite structure.

Returning to the example in FIG. 3, the fittings are continuous fittings that are adapted to each side of the working wall of the casing of the blade section and specifically for the two walls that are most mechanically stressed, which are walls 2a, 2b on skin side 21, 22.

The method for sizing such a mechanical link is applied as part of a detailed definition, as follows:

Stress is transferred between the composite and the metal elements by bolt attachments arranged in four rows, with all of the bolts having the same diameter. For industrial purposes, it is easier to have only a minimal number of bolt types to handle.

The composite has a uniform thickness for the sake of easier manufacturing.

However, the wings of the fitting and the splitter have a progressive thickness to equally distribute stress over each row, in accordance with the multishear calculation method.

The metal splitter is fastened to the fitting by attachments with a diameter of 26 mm that transfer stress by shearing.

Using the embodiment in FIG. 2 and according to the disclosed embodiments, to mechanically optimize the multishear link, instead of making the system resemble an equivalent system to which the Huth method can be globally applied, such as in the example in FIG. 6 from the prior art, the system is broken down into subassemblies, to which the Huth method is strictly applied, according to the modeling in FIG. 5.

In practice, the method of the disclosed embodiments consists of describing each shear by its stiffness and then applying simple and traditional mechanical relationships. The end result is a system of equations adapted for a computer-assisted resolution.

As such, it is possible to account for all of the specifics of each shear (material, module, thickness, etc.) and then calculate the exact stress at each point.

This makes it possible to size each area as well as possible through an iterative process. When an iteration is found to have too much stress, material is added, and likewise, if the stress is low, material can be removed.

To do this, according to the example in FIG. 5, the actual system is broken down into as many Huth systems as there are simple shear interfaces.

For example, for a fourth order shear link, two composite wings 141, 142 and three metal wings 51, 52, 53, as shown in FIG. 7, having three rows 61, 62, 63 of pins, the result obtained is a set of eight "mesh" Huth subsystems 100. This subassemblies are shown in FIG. 8 by sets of four springs 111, each spring being representative of the stiffness of the given material.

The springs are connected to nodes 110 corresponding to points of the pin/material interface.

According to the method, two adjacent meshes 100a, 100b are connected by a spring, which translates the fact that the same material is used by two separate shear areas. This is what the previous Huth model could not do.

To size the links, the various stiffness measures are then calculated based on the properties of the given materials, the geometry of the parts being used, and of course, the stress to be placed on the link.

Each pin and material can then factor in separately, allowing a greater selection in potential solutions.

A pin is any means of attachment passing through that can be used for such a link.

Identical pins can be used to simplify the industrial process, only the thickness of the various materials between each row of pins being adjusted. To the contrary, materials of the same thickness can be used, instead varying the sizes of the pins. It is also possible to choose an intermediate solution.

Figure 9:
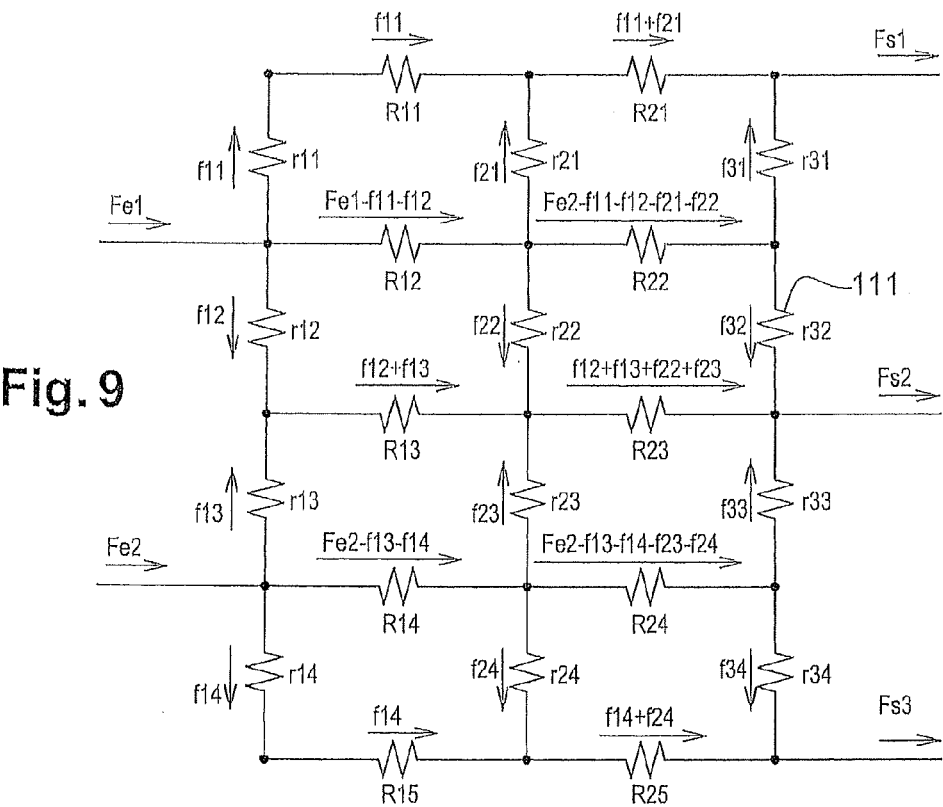
In FIG. 9: A representation of the link from FIG. 7 and the parameters of the link.

Starting from the mesh pattern, stress is calculated as shown in FIG. 9.

Here, we have rij, where i and j are integers, the stiffness of partition j of pins in row i, and Rik, where i and k are integers, the stiffness of the strip of material k in row i.

Stress is marked Fem (with m being an integer for incoming fluxes from the current composite part), Fsn (with n being an integer for outgoing fluxes), and fij (fluxes passing through the link), these fluxes being what the model is meant to determine.

Stresses fij directly represent the matting stress that is transmitted across the midplane of each composite wing to the adjoining metal wings.

The strips of material located between the rows of pins and stiffness Rik, metal wings and composite wings, are treated as being punctual. Therefore, all stiffness R for each wing is reduced to its midplane.

Stress in these strips of material is determined according to the transfer principle that, when crossing over the link, the value of an incident stress flux from a composite wing will decrease as the flux of stress increases in adjoining metal wings, with the pins carrying out this transfer between the composite parts and the metal parts through their own stiffness.

Once this schematic model is produced, compatibility equations are determined for the displacement and conservation of fluxes.

These equations are obtained from an electromechanical analogy by applying the law of meshes and the law of nodes.

Compatibility of displacements according to the law of meshes:

Meshes between rows 1 and 2:

$$\begin{cases} \dfrac{f_{11}}{r_{11}} + \dfrac{f_{11}}{R_{11}} - \dfrac{f_{21}}{r_{21}} - \dfrac{Fe_1 - f_{11} - f_{12}}{R_{12}} = 0 \\ -\dfrac{f_{12}}{r_{12}} + \dfrac{Fe_1 - f_{11} - f_{12}}{R_{12}} + \dfrac{f_{22}}{r_{22}} - \dfrac{f_{12} + f_{13}}{R_{13}} = 0 \\ \dfrac{f_{13}}{r_{13}} + \dfrac{f_{12} + f_{13}}{R_{13}} - \dfrac{f_{23}}{r_{23}} - \dfrac{Fe_2 - f_{13} - f_{14}}{R_{14}} = 0 \\ -\dfrac{f_{14}}{r_{14}} + \dfrac{Fe_2 - f_{13} - f_{14}}{R_{14}} + \dfrac{f_{24}}{r_{24}} - \dfrac{f_{14}}{R_{15}} = 0 \end{cases}$$

Meshes between rows 2 and 3:

$$\begin{cases} \dfrac{f_{21}}{r_{21}} + \dfrac{f_{11} + f_{21}}{R_{21}} - \dfrac{f_{31}}{r_{31}} - \dfrac{Fe_2 - f_{11} - f_{12} - f_{21} - f_{22}}{R_{22}} = 0 \\ Fe_2 - \\ -\dfrac{f_{22}}{r_{22}} + \dfrac{f_{11} - f_{12} - f_{21} - f_{22}}{R_{22}} + \dfrac{f_{32}}{r_{32}} - \dfrac{f_{12} + f_{13} + f_{22}}{R_{23}} \\ \dfrac{f_{23}}{r_{23}} + \dfrac{f_{12} + f_{13} + f_{22} + f_{23}}{R_{23}} - \dfrac{f_{33}}{r_{33}} - \dfrac{Fe_2 - f_{13} - f_{14} - f_{23}}{R_{24}} \\ -\dfrac{f_{24}}{r_{24}} + \dfrac{Fe_2 - f_{13} - f_{14} - f_{23} - f_{24}}{R_{24}} + \dfrac{f_{34}}{r_{34}} - \dfrac{f_{14} + f_{24}}{R_{25}} = 0 \end{cases}$$

Conservation of fluxes according to the law of nodes:

At this point, we have eight equations for determining 12 unknowns, the fij stresses. Therefore, there are four equations left, to be achieved based on boundary conditions.

$$\begin{cases} Fe_1 = f_{11} + f_{12} + f_{21} + f_{22} + f_{31} + f_{32} \\ Fe_2 = f_{13} + f_{14} + f_{23} + f_{24} + f_{33} + f_{34} \\ Fs_1 = f_{11} + f_{21} + f_{31} \\ Fs_2 = f_{12} + f_{13} + f_{22} + f_{23} + f_{32} + f_{33} \end{cases}$$

$$(Fs_3 = f_{14} + f_{24} + f_{34})$$

The last equation is placed between parentheses because it is redundant. That is, by conserving the flux, we always have Fe1+Fe2=Fs1+Fs2+Fs3. If the four previous equations are checked, the last must also be, adding nothing more than those equations.

There are therefore as many equations as there are unknowns, regardless of the complexity of the mechanical link.

In all, the linear system obtained for a link with a four shear and three rows of pins is shown in FIG. 11.

The system matrix must simply be reversed to obtain the stress fij crossing over the link.

Figure 10:
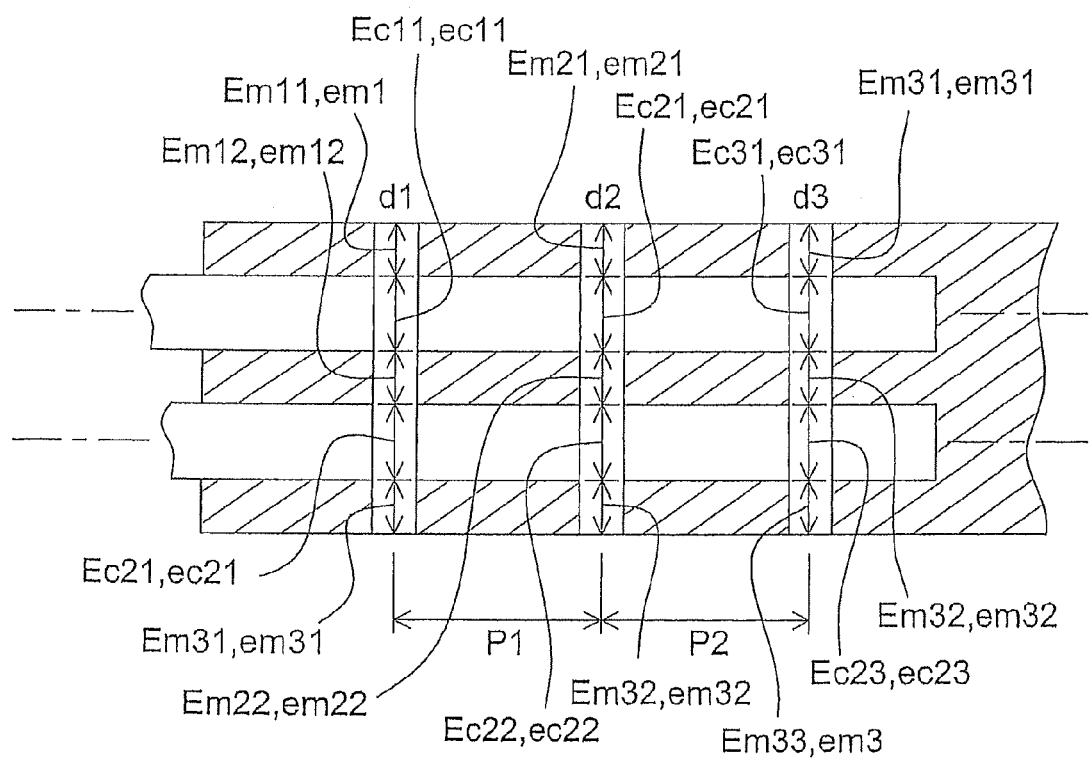
In FIG. 10: A representation of the modeling in the form of springs from the link in FIG. 7.

For this, the stiffnesses rij and Rik must be expressed according to the link parameters shown in FIG. 10: metal thickness Em and composite thickness Ec, Young modules for metal em and composite ec, pin diameters d, pitch between rows of pins P, and Young module for pins.

Finally, stresses Fem and Fsn must be determined, which make up the boundary conditions of the link.

The number of pins Npins per row is determined by giving a pitch between pins Pp in accordance with the geometric criteria ($4d \leq Pp \leq 5d$).

The equivalent Young modules for composite parts are determined from a standard calculation of orthotopic layers.

The rij are calculated from the Huth model.

For example, the following is the calculation of stiffnesses r34 and r22 in FIG. 9.

$$\dfrac{1}{r_{34}} = \xi \left( \dfrac{em_{33} + \dfrac{ec_{23}}{2}}{2d_3} \right)^{2/3} \left( \dfrac{1}{Em_{33}em_{33}} + \dfrac{1}{Ec_{23} \cdot \dfrac{ec_{23}}{2}} + \dfrac{1}{2E_f em_{33}} + \dfrac{1}{E_f \dfrac{ec_{23}}{2}} \right)$$

For the calculation of r34, the entire thickness of the metal wing em33 is considered because it is an outside wing, and half the thickness of the composite wing is used to account for the distribution of stress across the midplane of this wing.

For r22, the metal and composite wings used are inside the link, so we use half of their width.

Note that ξ=4.2 for a metal/composite link.

For stiffnesses Rik

The odd k indices correspond to the metal wings, and the even k indices correspond to composite wings. This gives us:

$$R_{ik} = \frac{E_{ik} e_{ik} W}{P_i}$$

where W represents the width of the link in plane symmetry or the average perimeter in cylindrical symmetry.

Stresses Fern, coming into the link through the composite, are determined by expressing the displacement compatibility of the composite wings and the conservations of fluxes at the non-pinned composite area, before the first row of pins.

This therefore gives us the equations below:

$$\begin{cases} \frac{Fe_1}{Ec_{11} ec_{11} W} l_c = \frac{Fe_2}{Ec_{12} ec_{12} W} l_c \\ Fe_1 + Fe_2 = F_{total} \end{cases}$$

Given that the total stress is set by the specifications of the link. For stresses Fsn, exiting the link through the metal wings, the thickness of the metal and modules are considered based on the last row of pins.

$$\begin{cases} \frac{Fs_1}{Em_{31} em_{31} W} l_m = \frac{Fs_2}{Em_{32} em_{32} W} l_m \\ \frac{Fs_2}{Em_{32} em_{32} W} l_m = \frac{Fs_3}{Em_{33} em_{33} W} l_m \\ Fs_1 + Fs_2 + Fs_3 = F_{total} \end{cases}$$

Once these stiffness calculations have been performed, they are transferred to the system matrix for the transfer of stress, which is reversed to obtain the stress fij crossing over the entire link.

Identical pins can be used to simplify the industrial process, adjusting only the thickness of the various materials between each row of pins. Materials of the same thickness can be used, instead varying the sizes of the pins. Otherwise, an intermediate solution may be used.

The disclosed embodiments apply to any composite metal linking device, including wind turbine blades, oil tubes, and composite structures for powder propellants, such as on the space shuttle or possibly on the wings of an aircraft.

According to one of these modes, it can also apply to metal/metal links or any other type of link, particularly with an overall optimization method.

The invention claimed is:

1. A method for making a mechanical multishear link, the multishear link capable of coupling a composite part between a metal wing-fitting element and a metal back-fitting element, comprising the steps of:
   providing the multishear link with a plurality of subassemblies so that attachment of each shear assembly to another is via simple shear interfaces between the subassemblies;
   defining each subassembly for each of the shear interfaces and describing a shear for each of the shear interfaces by a stiffness measure;
   determining the shear interfaces by applying a Huth method calculation to each of the shears to provide a mechanical relationship at each of the shear interfaces creating a system of equations for a computer-assisted resolution; and
   wherein coupling pins for coupling the composite part to the metal wing-fitting element and the metal back-fitting element at the shear interfaces are based on a result of the Huth method calculation.

2. The method according to claim 1, further comprising sizing each area of the multishear link around the shear interfaces through an iterative process by adding material when the iterative process indicates too much stress and by removing material when the iterative process indicates low stress.

3. The method according to claim 2, wherein the subassemblies are represented by sets of springs, with each spring representing the stiffness measure of a respective composite or metal materials.

4. The method according to claim 2, wherein with the iterative process is performed by keeping constant a thickness of the composite part and designing the metal fitting element with a progressive thickness in order to equally distribute stress over each row of the pins.

5. The method according to claim 1, wherein the multishear link is broken down into a set of mesh type Huth subsystems, and adjacent links are connected by a spring that represents the same material being used by two separate shear areas.

6. The method according to claim 1, wherein the stiffness measures are calculated based on properties of respective composite or metal materials, geometry of the parts being used, and stress being placed on the multishear link.

7. The method according to claim 6, wherein the stiffness measures are transferred to a transfer of stress system matrix, which is reversed to obtain stresses (fij) crossing over the multishear link.

8. The method according to claim 1, wherein, each pin and each material is accounted for independently.

9. The method according to claim 1, further comprising applying a fourth order multishear link with two composite blades, three metal blades, and three rows of pins, wherein the fourth order multishear link is broken down into a set of eight mesh type Huth subsystems.

10. The method according to claim 9, further comprising representing the subsystems by sets of four springs, with each spring representing a stiffness of a given material and sizing the fourth order multishear link using the subsystem.

11. The method according to claim 1, further comprising sizing the multishear link by calculating an exact stress at each location of the multishear link for each shear, based on material, module, and thickness at the each location.

12. The method according to claim 1, wherein said multishear link comprises a fitting, a back-fitting and a splitter to provide an assembly having a double mechanical shear perpendicular to attachments of the multishear link.

13. The method according to claim 1, wherein one or several splitters are inserted in the multishear link, rows of pins are provided in number and position according to an amount of shear stress expected at each attachment and wherein thickness of composite material is kept constant while thickness of the fitting element, back-fitting element and splitters is gradually increased for equally distributing stress on each row of pins.

* * * * *